Aug. 25, 1942.                M. GRAVES                2,294,231
                            TAPPING MACHINE
                         Filed Aug. 14, 1940
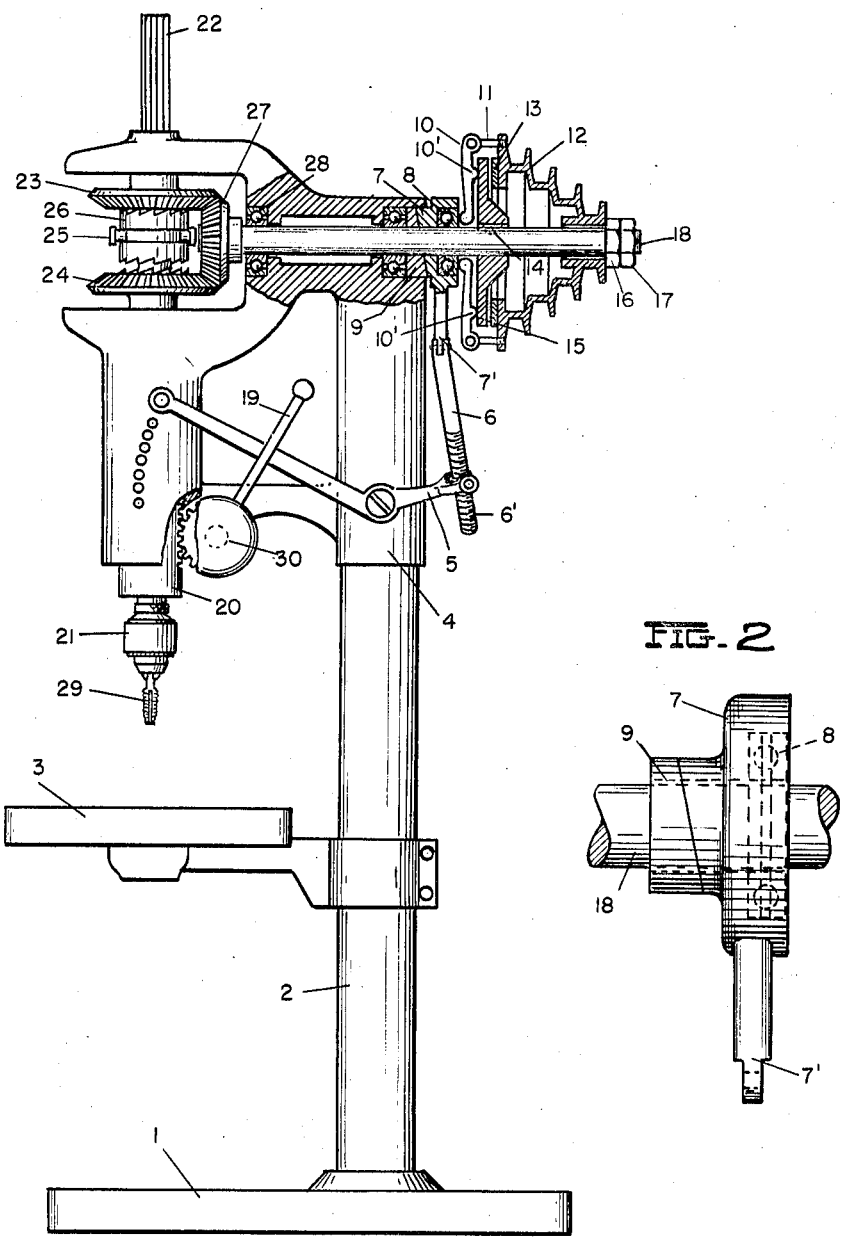
INVENTOR.
MARK GRAVES
BY Oberlin, Limbach & Day.
ATTORNEYS Patented Aug. 25, 1942

2,294,231

UNITED STATES PATENT OFFICE 2,294,231

TAPPING MACHINE

Mark Graves, Cleveland Heights, Ohio

Application August 14, 1940, Serial No. 352,565

4 Claims. (Cl. 10—135)

This invention relates to improvements in a tapping machine, and has as one of its objects the provision of means for controlling the drive of the tap holding spindle for tapping internal threads, or external threads, which spindles are required to be rotated in a clockwise or anticlockwise direction, during the tapping cycle, and in the reverse direction during the time of removing the tap from the work. The problem of tapping machines of this nature is one of long standing and various solutions thereof have been proposed, most of which involve complication of parts, making them costly to manufacture. Others require delicate adjustments rendering them unreliable for constant daily operation.

A still further object is the provision of an adjustable clutch, located on the drive shaft, whereby, through a lever arrangement, the clutch pressure may be controlled to such an extent as to cause slipping of drive plate, pulley and clutch, at a predetermined tension to avoid the breakage of the tap.

In the accompanying drawing, I have disclosed a specific embodiment of my invention, but obviously the construction may be materially changed without departing from the invention.

In the drawing, Figure 1 is a vertical view of one side of the tapping machine, constructed in accordance with this invention, showing the clutch control arrangement in section.

Figure 2 is a detailed section showing means for increasing or decreasing the clutch pressure.

Referring to the drawing, there is provided a base, 1, supporting column 2, carrying a usual work table 3, and on the upper end of column 2, is a housing 4, in which tap holding spindle 22 is slidably and rotatably supported by quill 20. The said tap holding spindle 22, is provided at its upper end with external splines, adapted to slidably engage the internal splines of the splined clutch sleeve 26. The lower end of said tap holding spindle is provided with means 21 for retaining a thread cutting tool 29. Quill 20, is provided with teeth on its outer surface to engage with the teeth of gear 30. Handle 19 is the usual means of revolving gear 30, providing means to lower or raise quill 20 which holds tap holding spindle 22.

Horizontal drive shaft 18 is rotatably mounted on bearings 28, in housing 4. Pinion 27 is fixed to one end of horizontal drive shaft 18 and the opposite end of horizontal shaft 18 is provided with a cone pulley 12 loosely mounted on drive shaft 18, and driven by the usual belt, not shown. Enough pressure must be applied against the clutch facing 13 and in turn against clutch plate 15, to rotate drive shaft 18 through key 14. Plate 15 is slidably keyed by key 14 to horizontal drive shaft 18, and clutch facing 13 is pressed between face of pulley 12 and clutch plate 15, by means of a pair of fingers 10 which are held in position by studs 11 on pulley 12 through pin connections therewith. Said fingers 10 have free ends engaging collar 8, which preferably is a thrust bearing of the ball type inserted in the outside face of cam 7. The pressure is increased or decreased by the rotation of cam 7 which rests against stationary cam 9 as shown in Fig. 2. The pressure is increased or decreased in accordance with the size of tap used to permit slippage instead of the breakage of tap which is rotated by tap holding spindle 22 through differential gears 23 or 24, pinion 27 and drive shaft 18. Control of the pressure on clutch plate 15 through cams 7 and 9 is made possible by the movement of actuating lever 5 which shifts rod 6 connected with arm 7' on cam 7 and causes cam 7 to rotate its inclined face against the inclined face of stationary cam 9. This increases or decreases the distance between the outside faces of cams 7 and 9. Since cam 9 is stationary and one face is an inclined plane, cam 7 which also has one face an inclined plane, must move toward clutch fingers 10 or away from fingers 10, depending on direction rotated. Lever 5 through rod 6 and its connection to cam 7 moves fingers 10, and thereby increases or decreases the pressure between pulley 12 and the slidably mounted clutch plate 15. Pulley 12 through plate 15 will drive shaft 18, and pinion 27 which, being mounted on one end of shaft 18, will drive differential gears 23 and 24.

In operation, the machine having been supplied with a tap 29, which will be driven by the drive shaft 18 through the bevel gear 27 meshed with gears 23 and 24, the lever 5 will be set at the proper adjustment for the tap used, which adjustment will be learned from experience. To increase the range of adjustment it is preferable that the end 6' of rod 6 be adjustably threaded through its connection with adjusting lever 5. Movement of rod 6 will cause cam arm 7' to rotate cam 7 about shaft 18. Such rotation of cam 7 will vary the distance between the outside faces of the pair of cam blocks 7 and 9, because the inner contacting faces of said blocks are inclined planes. Cam block 9 is fixed in the housing 4, hence rotative movement of cam block 7 will cause said block 7 to press against the collar 8, which preferably will be a thrust bearing of the ball type. Collar 8 will be urged against the free ends of fingers 10, and the bearing points 10' of said fingers will slide clutch plate 15 into engagement with pulley 12 through clutch facing 13. It will be understood that pulley 12 will be rotated about shaft 18, by motor driven belts not shown. When clutch plate 15 is urged into engagement with pulley 12, as explained, the shaft 18 will be driven by said clutch plate 15. The pressure with which clutch plate 15 is urged against pulley 12 is determined by the selective setting of the lever 5, and will be such that there will be slippage between clutch plate 15, pulley 12 and clutch facing 13 when the resistance the work piece offers to the tap 29 approaches a limit which is liable to break the tap. The relation between such resistance and the said slippage may be easily and closely controlled through the adjustments offered by the lever 5 and the shaft 6 through which it operates.

What I claim is:

1. In a tapping machine as described, a drive control comprising a drive shaft; a pulley rotatably mounted on said shaft; a clutch plate slidably keyed on said shaft adjacent said pulley and operative to rotate with said shaft; studs mounted in the circumferential portion of a face on said pulley; fingers pivotally supported by said studs, which fingers extend toward said shaft and have a mid-portion engaging a face of said clutch plate; a collar mounted on said shaft in engagement with the free ends of said fingers; and means operative to press said collar against said fingers with a predetermined pressure, which means include a pair of cam blocks through which said shaft is rotatably mounted; inclined faces, one of which is on each of said blocks, which faces are in engaging relation; means operative to rotate one of said blocks into engagement with said collar and adjustably hold such block when moved through a desired angle of rotation about said shaft; and means operative to hold the other of said blocks in fixed position.

2. In a tapping machine as described, a drive control comprising a drive shaft; a pulley rotatably mounted on said shaft; a clutch plate slidably and non-rotatably mounted on said shaft adjacent one side of said pulley; a pair of cam blocks mounted on said shaft in relation permitting rotation of said shaft therewithin; a pair of inclined faces, one on each of said cam blocks, which faces are in contacting engagement; means holding one of said blocks in fixed position; means operative to rotate the other of said blocks about said shaft and hold said rotated block at a desired angle of rotation, whereby the operative over-all length of said two blocks is varied as desired; and means, actuated by said cam blocks, operative to urge said clutch plate against the adjacent pulley with a pressure which varies with changes in the operative over-all length of said pair of cam blocks.

3. In a tapping machine as described, a drive control comprising a drive shaft; a pulley rotatably mounted on said shaft; a clutch plate slidably and non-rotatably mounted on said shaft adjacent said pulley; a pair of cam blocks in operative relation with said clutch plate and provided each with an inclined face, which inclined faces are in operative engagement; means operative to effect relative movement between said blocks whereby variation is secured in the distance between the outside faces of said pair of blocks; and means operative responsive to changes in the distance between the outside faces of said blocks, effective to exert and modify pressure urging said clutch plate against said pulley.

4. In a tapping machine as described, a drive control comprising a drive shaft; a pulley rotatably mounted on said shaft; a collar slidably mounted on said shaft; a clutch plate slidably and non-rotatably mounted on said shaft between said pulley and said collar; means operative to engage said clutch plate and press it against said pulley responsive to movement of said collar; and adjustable means operative to urge said collar toward said clutch plate.

MARK GRAVES.